Oct. 20, 1925.                                                   1,558,026
C. W. LYONS
MILK BOTTLE RECEPTACLE
Filed June 18, 1923

INVENTOR:
CLARENCE W. LYONS,
By
Graham + Lurie
ATTORNEYS.

Patented Oct. 20, 1925.

1,558,026

UNITED STATES PATENT OFFICE.

CLARENCE W. LYONS, OF LOS ANGELES, CALIFORNIA, ASSIGNOR OF ONE-HALF TO LOLA K. KIMBALL, OF LOS ANGELES, CALIFORNIA.

MILK-BOTTLE RECEPTACLE.

Application filed June 18, 1923. Serial No. 646,129.

*To all whom it may concern:*

Be it known that I, CLARENCE W. LYONS, a citizen of the United States, residing at Los Angeles, in the county of Los Angeles and State of California, have invented a new and useful Milk-Bottle Receptacle, of which the following is a specification.

This invention relates to receptacles in which an article such as a milk bottle may be placed, but can not be removed therefrom without the use of means, such as a key, for opening the receptacle. It is customary in most cities to deliver milk during the early hours of the morning, the bottles of milk being ordinarily placed upon the porch or door-step where they offer an invitation to predatory persons.

It is an object of the invention to provide a milk bottle receptacle, which may be very cheaply manufactured, but is of such substantial construction that it can not be easily broken into.

It is a further object of the invention to provide an improved form of cover member, and a simplified form of closing means adapted to co-operate with the cover member in such a manner that the thrust upon the doors is received directly by the operating members, thus providing a closure construction which can not be defeated without the use of heavy tools.

The especial advantages of the invention and further objects thereof will be made evident hereinafter.

Referring to the drawing which is for illustrative purposes only.

Figure 1:
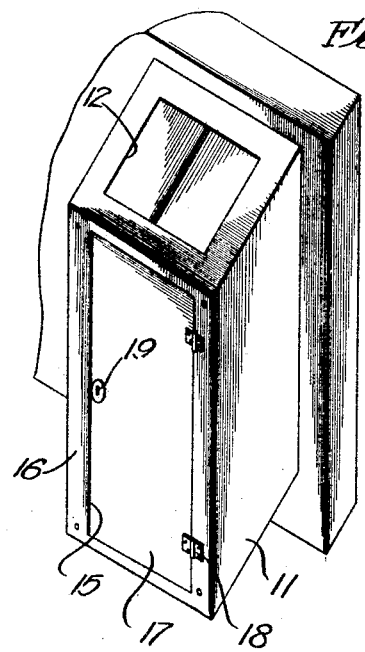
Fig. 1 is a perspective view, showing the manner in which a milk bottle receptacle embodying the features of my invention may be mounted upon a vertical structure member such as the wall of a house.
Figure 2:
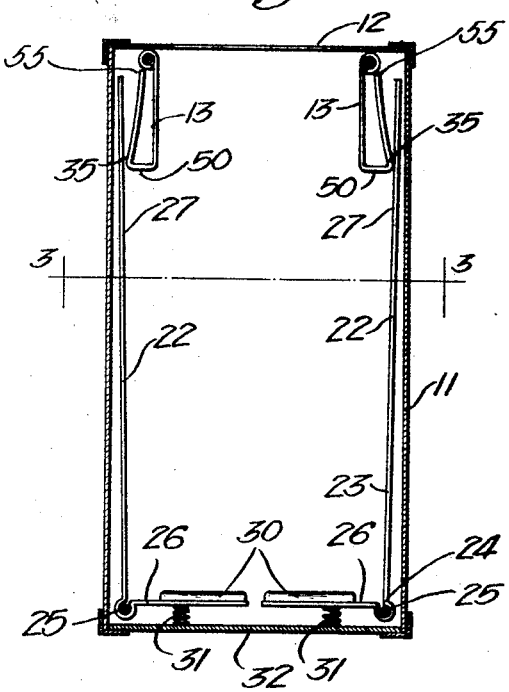
Fig. 2 is a vertical section through a milk bottle receptacle. In this view the receptacle is shown in receptive condition.
Figure 4:
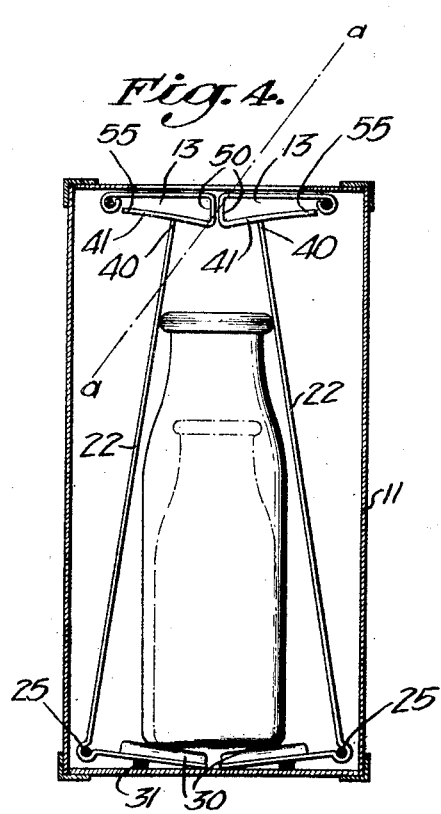
Fig. 4 is a vertical section similar to Fig. 2, but showing a milk bottle in place within the receptacle, and the doors of the receiving opening closed as the result of the placement of the milk bottle in the receptacle.
Figure 3:
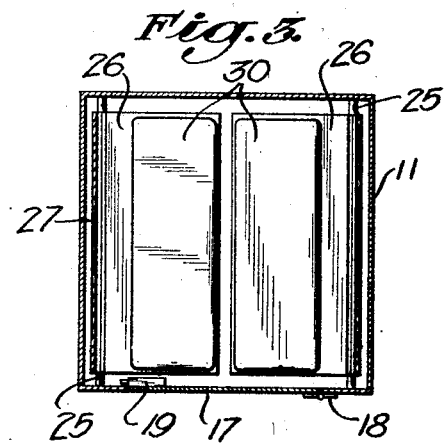
Fig. 3 is a section taken upon a plane represented by the line 3—3 of Fig. 2.

As shown in the drawing, the invention employs a housing 11, consisting of a rectangular box, having a receiving opening 12 in the top thereof, adapted to be closed by closure members 13 and having a delivery opening 15 in the front wall 16 thereof, which opening 15 is closable by a door 17, hinged to the housing 11 as indicated at 18 and being provided with a key operated lock 19, for locking the door in closed position. Means for swinging the members 13 from the open position indicated in Fig. 2 to the closed position shown in Fig. 4 are provided in the form of levers 22 formed from metal plates 23, bent to provide tubular channels 24 as indicated in Fig. 2 through which rods 25 extend for the purpose of pivotally mounting the levers 22. The lower ends 26 of the levers 22 are inwardly directed in positions substantially perpendicular to the upstanding portions 27 of the members 22 and upon the ends 26 pads 30, preferably of rubber or cork, are placed for receiving the impact of a milk bottle when it is dropped through the receiving opening 12 into the interior of the receptacle. Springs 31 are provided between the ends 26 of the members 22 and the floor 32 of the housing 11 for holding the levers 22 in retracted position as shown in Fig. 2 and allowing the closure members 13 to hang in front of the upper ends of the members 22 also as shown in Fig. 2.

When a milk bottle is dropped into the receptacle, a pronounced blow is received by the pad 30 with the result that the vertical portions 27 are swung forcibly inwardly from the positions indicated in Fig. 2. It will be noticed that each closure member 13 is of somewhat triangular shape and that the outer corners 35 thereof rest against the members 22, so that as these members swing inwardly the initial movement thereof is imparted to the lower ends of the closure members 13, thus applying the starting force to the closure members 13 at a point giving the greatest leverage. As the members 13 swing up into closed position as indicated in Fig. 4, the upper extremities 40 of the levers 22 pass across the face of the arcuated portions 41 of the members 13, which portions are arcuated to conform substantially to the arc described by the ends 40 of the members 22 when they swing on the pins 25. It will be seen that by this regular increase in thickness of the members 13 as the ends thereof are approached, it is possible to hold the closure members 13 in fully raised position. Any thrust placed upon the members 13 from the outside in an attempt to get into the box is received as a direct thrust upon the members 22, thus making it impossible by rattling the cover members to dislodge the members 22.

A further advantage of the construction shown is the provision of end walls 50 on the members 13, which end walls come together when the members are in closed position as shown in Fig. 4 and prevent the insertion, in a diagonal direction as indicated by the dotted line $a$—$a$, of a blade through the slit between the end walls 50, for the purpose of forcing back one of the members 22. It may be desirable to form the portion 41 of the members 13 of resilient material so that the ends 55 could swing inwardly under pressure applied by the ends 40 of the members 22.

The device herein shown may be very rigidly constructed at but small cost. The improved features thereof prevent access to the interior of the receptacle when an article is in place therein, by forcing back the levers 22, which may be accomplished in some of the present types of milk bottle receptacles by inserting a knife blade through the space existing around and between the closure members which obstruct the receiving opening.

I claim as my invention:

1. In a receptacle of the class described, the combination of: a housing providing a chamber to which communication is gained through an opening in the top of said housing; lever members extending upwardly on opposite sides of and within said chamber, said lever members having inwardly projecting shelves at their lower ends and being pivoted at their lower ends so that the upper ends of said lever members will swing inwardly when said shelves are depressed; and a door member pivoted at each side of said opening and adapted to hang down in front of the upper end of one of said lever members, the under faces of said doors being arcuated to conform with the arcs described by the upper ends of said lever members as they swing inwardly.

2. In a receptacle of the class described, the combination of: a housing providing a chamber to which communication is gained through an opening in the top of said housing; lever members extending upwardly on opposite sides of and within said chamber, said lever members having inwardly projecting shelves at their lower ends and being pivoted at their lower ends so that the upper ends of said lever members will swing inwardly when said shelves are depressed; and a door member pivoted at each side of said opening and adapted to hang down in front of the upper end of one of said lever members; said doors being of increased thickness at the swinging ends thereof, and the under faces thereof being arcuated to conform with the arcs described by the upper ends of said lever members as they swing inwardly.

3. In a receptacle of the class described, the combination of: a housing providing a chamber to which communication is gained through an opening in the top of said housing; lever members extending upwardly on opposite sides of and within said chamber, said lever members having inwardly projecting shelves at their lower ends and being pivoted at their lower ends so that the upper ends of said lever members will swing inwardly when said shelves are depressed; and a door member pivoted at each side of said opening and adapted to hang down in front of the upper end of one of said lever members; said doors being of increased thickness at the swinging ends thereof, there being provided co-operating flat faces at the ends of said doors for preventing diagonal insertion of a blade therebetween when in closed position, and the under faces thereof being arcuated to conform with the arcs described by the upper ends of said lever members as they swing inwardly.

4. In a receptacle of the class described: a swinging door adapted to be open when the receptacle is empty; and a lever adapted to close said door when an article is placed in the receptacle, said door being of gradually varying thickness and contacting with the lever, when open, at its thickest portion, the thickest portion of the door being nearest to the fulcrum of the lever.

In testimony whereof, I have hereunto set my hand at Los Angeles, California, this 11th day of June, 1923.

CLARENCE W. LYONS.